Figure 1:
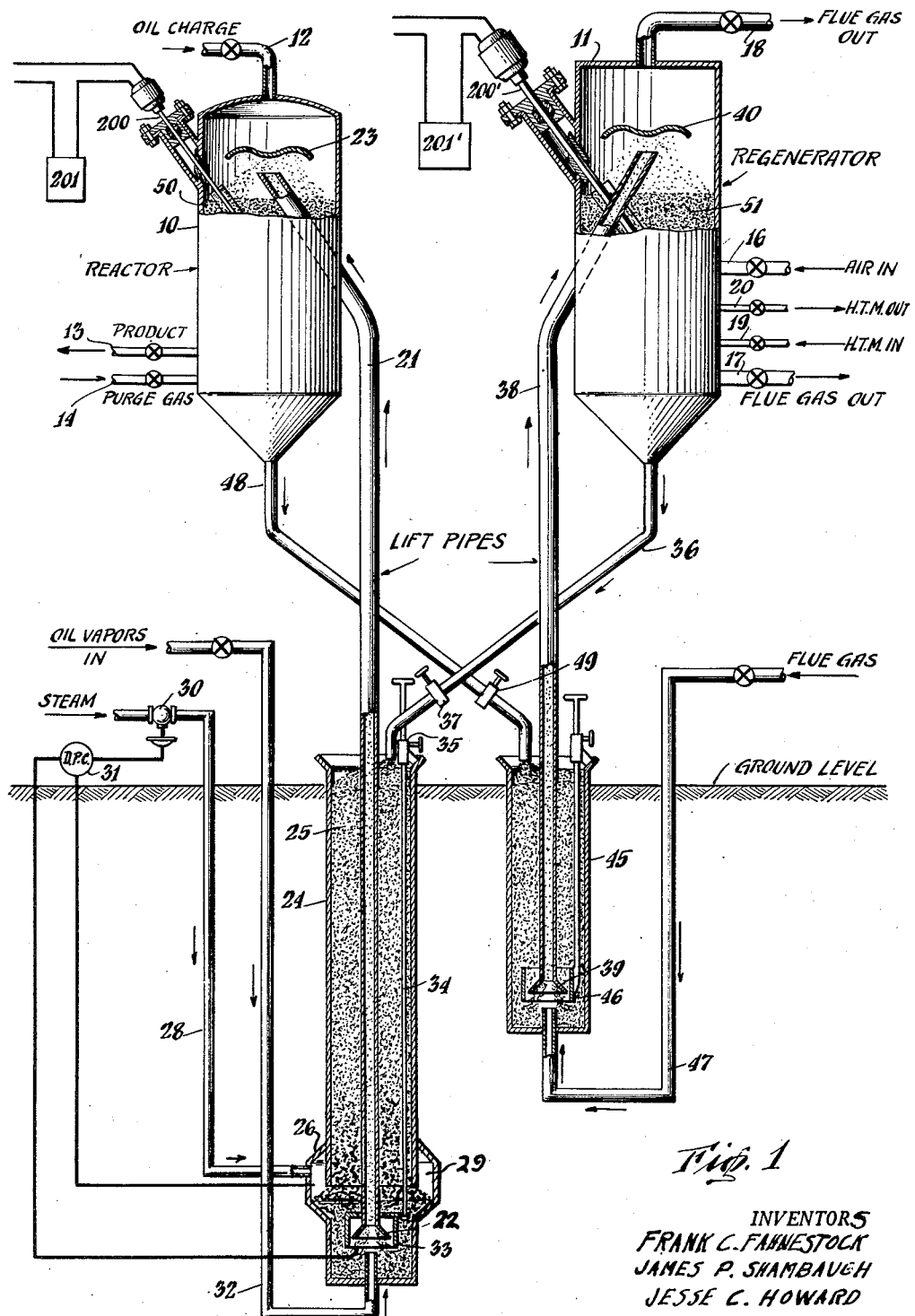

Dec. 21, 1954   F. C. FAHNESTOCK ET AL   2,697,685
METHOD AND APPARATUS FOR CONDUCTING MOVING CONTACT
MATERIAL HYDROCARBON CONVERSION PROCESSES
Filed March 11, 1949   3 Sheets-Sheet 1

INVENTORS
FRANK C. FAHNESTOCK
JAMES P. SHAMBAUGH
JESSE C. HOWARD
BY John A. Crowley, Jr.
AGENT OR ATTORNEY

United States Patent Office 2,697,685
Patented Dec. 21, 1954

2,697,685

METHOD AND APPARATUS FOR CONDUCTING MOVING CONTACT MATERIAL HYDROCARBON CONVERSION PROCESSES

Frank C. Fahnestock, Manhasset, James P. Shambaugh, Huntington, and Jesse C. Howard, Freeport, N. Y., assignors to Socony-Vacuum Oil Company, Incorporated, a corporation of New York Application March 11, 1949, Serial No. 80,866

10 Claims. (Cl. 196—52)

This invention pertains to processes for conversion of fluid hydrocarbons in the presence of a granular contact material which may or may not be catalytic in nature. Typical of the processes to which this invention pertains are the catalytic cracking conversion, isomerization, hydrogenation, reforming, dehydrogenation aromatization, hydroforming, treating and desulfurization of petroleum fractions. Also typical are the coking, viscosity reducing of petroleum residuums and high temperature pyrolytic conversion processes such as the conversion of propane and ethane to ethylene or of methane to acetylene. In these latter processes the granular contact material serves merely as a heat carrying material.

An important commercial unit for continuously conducting reactions of this type is one wherein the granular contact material is passed cyclically through a hydrocarbon conversion and a contact material reconditioning zones in which it flows downwardly as a substantially compact column. The contact material employed in such a process may be a catalyst in the form of natural and treated clays, bauxites, inert carriers impregnated with certain catalyst active metallic oxides or synthetic associations of silica, alumina, magnesia or of combinations thereof to which may be added small amounts of metallic oxides for specific purposes. When the contact material is employed for heat carrying purposes only it may take the form of metal balls, capsules containing fusible alloys, pebbles, carborundum, mullite, zirconium oxide, fused alumina and the like. For coking processes the solid material may consist of a low activity clay catalyst, petroleum coke or porous inert material such as pumice. The contact material may be in the form of pellets, spheres, tablets or irregular shaped particles and it should be understood that the term "granular" is employed broadly herein as covering any of the above. The contact material granules may range in size from about one-half inch to 80 mesh Tyler, and preferably should be of the order of 4 to 20 mesh size.

This invention is concerned with an improved system for conducting reactions of the type discussed above in the presence of a cyclically moving granular contact material and particularly with the contact material circulation part of such system.

Heretofore, it has been customary in commercial installations to position the reaction and regeneration vessels side by side and to circulate contact material between the vessels in bucket elevators. Such elevators are unsatisfactory for extremely high temperature operations due to mechanical failure and also impose undesirable practical limitations on the maximum rate of contact material circulation. It has been the practice for some time in processes involving powdered contact material which is maintained in a suspended or fluidized state in the reaction vessels, to accomplish the transfer of the powdered catalyst between contacting vessels by pneumatic conveying devices. In operations of this type in which one of the contacting vessels is an up-flow vessel, i. e. the catalyst is carried upwardly through the contacting chamber in suspension, it is customary to pass the catalyst in suspension in the reactant vapors from the contacting vessel to a separator located at a high level. The separated catalyst drops into a standpipe which is connected to the bottom of the separator. The standpipe is a long column of fluidized catalyst which acts similarly to a liquid to create a hydrostatic head at its lower end so that catalyst may flow from the lower end of the standpipe through a control valve into a stream of transport gas which is under sufficient pressure to carry the catalyst into the other contacting zone of the cyclic system. An operation of this type which requires withdrawal of catalyst and reactant together from the reaction vessel is obviously not applicable to a process in which granular catalyst flows by gravity as a compact bed and in which reactant and contact material are withdrawn separately from the reaction vessel. It has also been suggested that powdered catalyst may be injected from a high pressure contacting zone by means of a screw conveyor into the lower end of a standpipe and passed from the upper end of the standpipe at a higher elevational level through a pipe connected into a lower pressure contacting vessel. Systems of this type are inherently systems in which the higher pressure contacting zone is at the lower elevational level which is often an undesirable restriction. Also, such systems require closed connections between the two reaction chambers and the opposite ends of the gas lift column or pipe. This means that the reactor and regenerator in a catalytic cracking system are in closed communication with each other through closed, non-vented conduits. In order to prevent reactant or regeneration gas flow between vessels it has been necessary to maintain a close balance between the hydrostatic head created by the standpipe and the differential in pressure between the reactor and regenerator. In such systems the operation of the standpipe must be carefully controlled within relatively narrow ranges so that it acts itself as the seal between the reaction and regeneration zones. Thus, desirable flexibility in control of the pneumatic transfer system must be sacrificed in order to maintain a seal between reactor and kiln, the loss of which would result in failure of operation and serious damage to the catalytic conversion unit. Likewise, in operations of this type the flexibility of operation of the reaction and regeneration vessels is to a large extent curbed by the dictates of the standpipe operation and design limitations. It has recently been suggested in the prior art that in moving bed systems employing granular catalyst, the catalyst may be passed downwardly from either of the contacting vessels through a long downwardly sloping drain pipe which connects on its lower end into the lower end of a gas lift pipe. Contact material flow to the lift pipe is controlled by a valve near the lower end of the drain pipe. A lift gas is supplied into the lower end of the lift pipe at a pressure sufficiently high to effect lifting of the contact material to a separator at a high elevation from which it may flow to the other contacting vessel. This type of operation also has the disadvantage that the lower end of the lift pipe is connected through a closed, non-vented conduit to the contacting vessel feeding it so that a sudden change in pressure in either the contacting vessel or in the gas lift pipe is apt to seriously affect the operation of the other and so that there is the ever present danger of contacting and lift gases mixing and causing a fire. For example, a loss of the catalyst leg between the contacting vessel and the lift pipe will permit gas to flow between the lift feed zone and the contacting zone. One gas may be hydrocarbon and the other may be air. Moreover, where the contacting vessel from which the catalyst flows to the lift is operating at low pressures the drain leg feeding to the lift pipe is necessarily of considerable vertical length thereby requiring that that contacting vessel be positioned at a much higher level above the ground than is the case in present commercial moving bed systems which employ elevators for catalyst transfer. If the two contacting vessels are superposed, this means a shifting upward of the entire cracking system. This results in substantial and undesirable increase in the structural steel requirements and costs. If part of the gaseous pressure in the contacting vessel in such systems is relied upon to build up part of the head required to feed catalyst into the lift pipe operating under a higher pressure, in such systems, a sudden drop of pressure in the contacting vessel is very apt to result in a stoppage of catalyst flow in the leg feeding the lift pipe. Such systems have not been employed commercially in moving bed type cracking systems handling granular catalysts.

It is a major object of this invention to provide an improved method and apparatus for conducting hydrocarbon conversion in the presence of moving granular contact material.

A specific object is the provision in a process wherein granular contact material is passed cylically through reaction and reconditioning zones in which it flows as a compact bed of gravitating material of an improved method and apparatus for accomplishing the contact material circulation which method and apparatus overcomes the disadvantages of the prior art systems discussed hereinabove.

These and other objects of this invention will become readily apparent from the following discussion.

It should be noted that in all of the prior art systems employing pneumatic transfer lifts in conjunction with continuous, moving contact material, hydrocarbon conversion systems, it has been considered necessary that the contacting vessel feeding the gas lift should be in closed, gas tight connection with the lower end of the gas lift in spite of the fact that this results in a serious loss in operation flexibility. This principle is repeatedly emphasized in prior art patents showing systems of the type discussed hereinabove. It has now been discovered contrary to what was formerly believed by the prior art that the connection between the lift pipe and the contacting vessel feeding the same need not be closed and gas tight but instead, if vented to the atmosphere at the proper location will provide a number of important advantages. According to one form of this invention contact material is passed downwardly from one of the contacting zones as a compact, gravitating seal stream to the lower end of a lift pipe where it is suspended in a stream of lift gas and pneumatically conveyed upwardly to a location which is in gravity flow communication with the other contacting zone. A vent to the atmosphere is maintained at an intermediate point along said seal stream located so as to leave a substantial length of stream above said vent which is at least in part vertical and a substantial length of stream below said vent, at least most of which is vertical. Thus, any pressure on the stream coming from either the contacting vessel or the lift pipe is reduced at the level of the vent and the contact material feeds into the lift pipe from the level of the vent purely by virtue of the head of contact material in the stream below the vent level. Because of the vent some gas will flow downwardly from the lower end of the contacting zone through the upper portion of the compact seal stream to the vented point and some gas will flow upwardly from the region of the lower end of the lift pipe to the vented point through the portion of the compact seal leg which extends downwardly below the vent. In one form of this invention a receptacle of substantially greater horizontal cross-sectional area than the compact seal stream may be provided around the lower end of the lift pipe to permit maintenance of a bed of the contact material around the lower end of the lift pipe. The compact seal stream may deliver onto the surface of the bed a substantial distance above the lower end of the lift pipe. According to the preferred form of the invention, the lower end of the lift pipe is positioned substantially below ground level so that at least most of the compact stream below the vent level at least is below ground level. By this method and apparatus the operation of the contacting vessels and of the gas lift device may be independently controlled without the necessity for the delicate balancing of pressures characteristic of prior art systems. Also, by provision of the vent to the atmosphere there is obviated the danger of reactant gas flow between the contacting zones communicating opposite ends of the gas lift which danger is ever present in prior art arrangements whenever the seal legs are lost or the pressure balances are upset. In addition, this is all accomplished by the preferred form of this invention without any substantial increase in height above ground level of the system over present commercial cracking systems employing catalyst transfer elevators, and for some operations an actual reduction in overall unit height above ground level is made possible.

Figure 2:
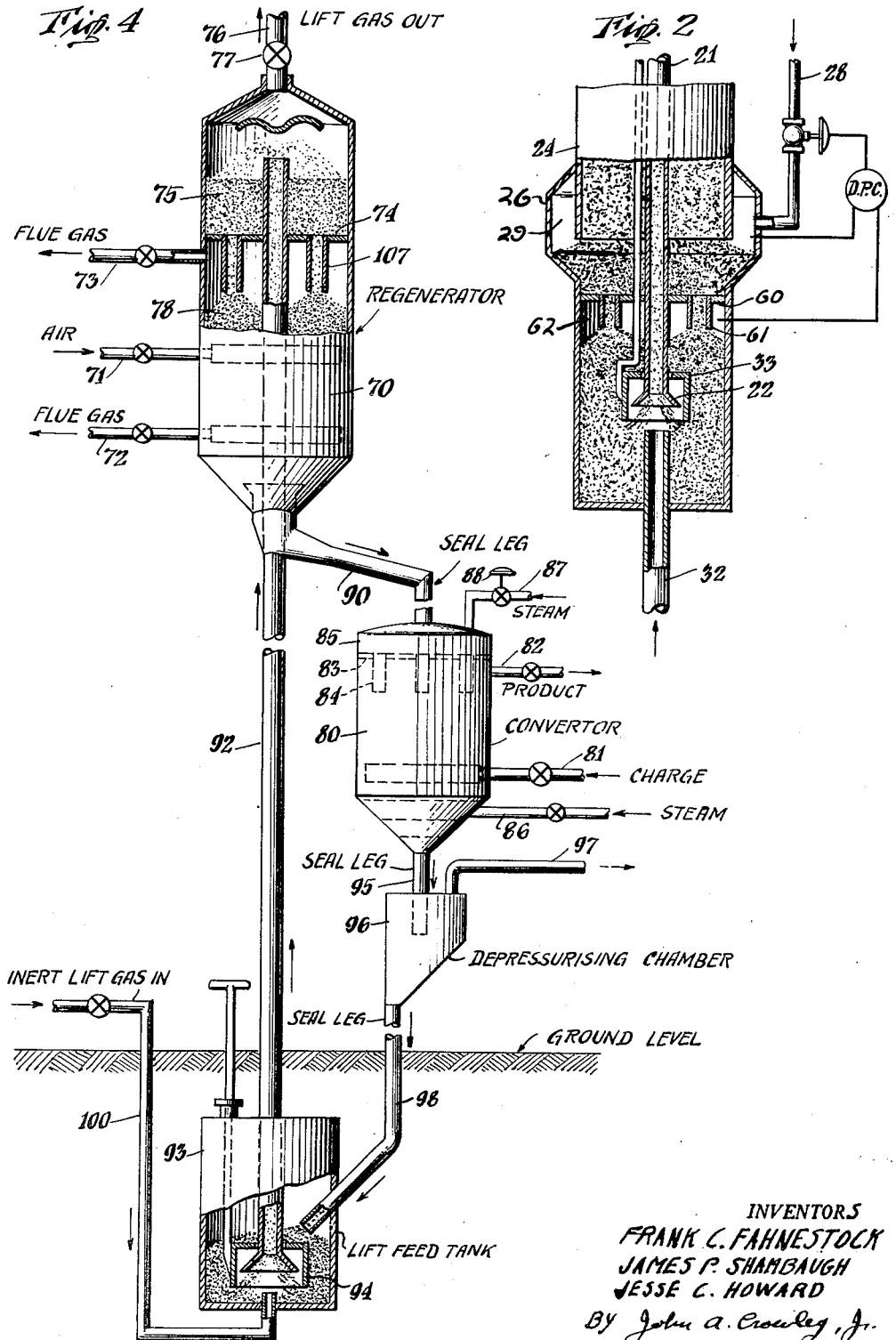
Figure 3:
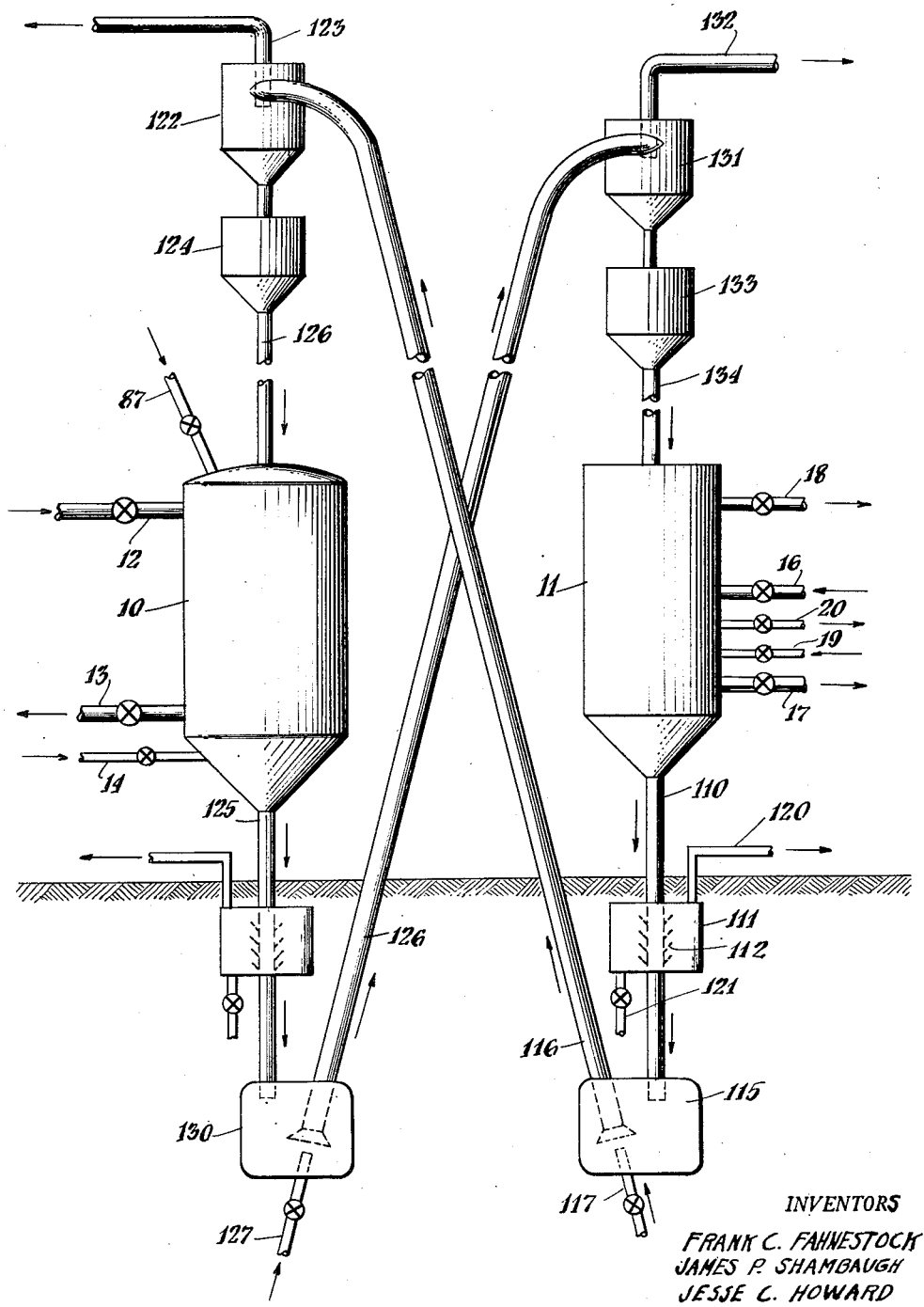

This invention may be more readily understood by reference to the drawings attached thereto in which Figure 1 is an elevational view, partially in section, showing a preferred arrangement of the apparatus of this invention; Figure 2 is an elevational view, partially in section, showing a modified form of part of the gas lift feeding device shown in Figure 1; Figure 3 is an elevational view with modified arrangements for conducting this arrangement, and; Figure 4 is an elevational view, partially in section, of still another modified arrangement for conducting this invention.

Turning now to Figure 1, there is shown positioned side by side shortly above ground level a reactor vessel 10 and a regenerator vessel 11. The reactor vessel is provided with an oil charge conduit 12 at its upper end and an outlet for withdrawal for gasiform products 13 near its lower end. A purge gas inlet 14 connects into the reactor 10 at a level below the outlet 13. Gas collecting devices may be provided in the lower section of the reactor in communication with the outlet 13 and the gas distributing devices may be provided in communication with the inlet 14 and baffles may be provided in the bottom of vessel 10 to encourage uniform catalyst movement down through all sections of the vessel. Devices for accomplishing these purposes are well known to the art and need not be further discussed herein. The regenerator vessel is provided with an air inlet 16 at an intermediate level along its length and a flue gas outlet 17 near its lower end and a second flue gas outlet 18 at its upper end. This arrangement provides for split flow of the inlet air in part upwardly through the catalyst bed in the upper section of the regenerator and in part downwardly through the catalyst bed in the lower section of the regenerator. Heat transfer tubes may be provided at a suitable level along the lower section of the regenerator and these tubes may be supplied with heat transfer medium of a suitable type through inlet pipe 19. Heat transfer medium may be withdrawn through outlet pipe 20. A gas lift pipe 21 extends upwardly from its flared lower end 22 located at a level substantially below ground level to its open upper end at a location which is at least as high as and in gravity flow communication with the upper section of the reactor. The lift pipe 21 may discharge directly into the upper section of the reactor as shown in Figure 1 or it may discharge into a suitable separation chamber positioned above vessel 10, where it is separated from the lift gas and then permitted to gravitate through a suitable conduit down onto the bed within the vessel 10. In this latter modification the separator chamber may be maintained at a pressure near that in the reactor in which case the gravity flow conduit of the separator to the reactor may be of relatively short length. On the other hand, the separator may be maintained at a pressure lower than that in the reactor in which case the conduit connecting these chambers takes the form of an elongated gravity feed leg. In the form shown in Figure 1, a baffle 23 is supported by suitable means (not shown) within the reactor 10 above the upper end of the lift pipe 21. This baffle serves to deflect the contact material discharged from the lift pipe down onto the bed in the reaction zone therebelow. Surrounding the lower portion of the lift pipe including its lower end there is provided a member defining a vessel 24 which is arranged concentrically with the lift pipe. The shaft 24 is closed on its bottom a spaced distance below the lower end of the lift pipe 21 and is of substantially greater diameter than the lift pipe so as to provide an annular passage 25 for contact material flow between the shaft 24 and lift pipe 21. The shaft 24 extends upwardly to a level near the surface of the ground and is open to the atmosphere on its upper end. Alternatively, if desired, the shaft may be closed at its upper end and a vent pipe may be provided on its top to vent the shaft either to the atmosphere directly or to a suitable chamber which is in turn vented to the atmosphere. When the shaft 24 is of considerable length, for example 80 feet or more, it should preferably be tapered along its length rather than straight so that its diameter is the greatest at its upper end. An expanded section 26 is provided near the lower end of shaft 24, the upper part of the shaft extending downwardly into the expanded section so as to provide a gas space 29. A gas inlet conduit 28 connects into the gas space 29 and extends upwardly to a location above ground level. A diaphragm operated valve 30 is provided on conduit 28 and a differential pressure control device 31 is provided in association with valve 30 so as to control the opening in valve 30 in such a manner as to maintain an inert gaseous pressure in the space 29 which is slightly higher than the gaseous pressure immediately below the lower end of the gas lift pipe. An inlet conduit 32 connects the bottom of shaft 24 and terminates a short distance below and directly beneath the flared lower end 22 of the lift pipe. A movable sleeve 33 closely surrounds the flared lower end of the lift pipe and a rod 34 is connected to this sleeve and extends vertically upwardly to a point above ground level so as to permit raising and lowering of the sleeve 22. A set screw device 35 may be set to hold the rod at any desired level. A conduit 36 extends downwardly from the bottom of regenerator 11 to the upper end of the shaft 24. A slide valve 37 is provided near the lower end of conduit 36 and this valve is of a type, which when opened, imposes no substantial restriction on the flow in conduit 36. The conduit 36 should be vertical along a substantial portion of its length so as to insure a good and adequate seal against excessive gas loss from the regenerator. A second lift pipe 38 extends upwardly from its flared lower end 39 at a level below ground level to a location within the upper section of regenerator 11. A baffle 40 is provided within the regenerator above the upper end of lift pipe 38 to downwardly deflect the contact material. A shaft 45 similar to but shorter than shaft 24 surrounds the lower portion of lift pipe 38. A movable sleeve 46 is provided around the flared lower end 39 of this lift pipe. A gas inlet 47 connects into the bottom of shaft 45 and terminates beneath the lower end of the lift pipe 38. The conduit 48 bearing a slide valve 49 near its lower end extends downwardly from the bottom of the reactor 10 to the upper end of shaft 45.

As an example of the operation of this apparatus its application to a catalytic process for converting hydrocarbons may be considered. A granular contact material such as a natural clay is maintained as a substantially compact bed within the reactor 10 below the level of the discharge end of lift pipe 21. A hydrocarbon vapor charge which has been preheated to a suitable reaction temperature if desired, for example 850° F., is supplied to conduit 32 and passes therefrom into the lower end of lift pipe 21. This vapor stream suspends catalyst within the lower end of shaft 24 and carries the suspended catalyst up through lift pipe 21 into the reactor 10. The rate of catalyst entry into lift pipe 21 is controlled by regulation of the effective distance between the lower end of lift pipe 21 and the discharge end of conduit 22. This is accomplished by raising or lowering the sleeve 33. In general, if the sleeve 33 is raised the amount of catalyst entering the lift pipe increases even though the rate of oil vapor charge is constant. Additional control may be obtained by varying the rate of oil vapor charge, but it is usually preferable to maintain this within a narrow range to provide suitable linear velocities within the lift pipe 21. The catalyst discharged from the upper end of lift pipe 21 flows down onto the bed 50 in reactor 10 and the hydrocarbon lift vapor passes downwardly through this bed to effect its conversion to lower boiling gasiform hydrocarbon products. These products which usually contain gasoline are withdrawn from the lower section of the reactor through conduit 13. Usually, it is desirable to supply additional hydrocarbon charge to the reactor 10 either in liquid or vapor phase via the inlet 12. When the lift pipe 21 discharges into a separator maintained above the reactor vessel, the lift gas employed is generally an inert gas such as steam or flue gas instead of hydrocarbon vapors, and this gas is separated from the catalyst before the latter passes into the reaction zone. Spent contact material bearing a carbonaceous deposit is withdrawn from the bottom of reactor 10 through conduit 48 onto the substantially compact column of contact material maintained within the shaft 45. The valve 49 may be maintained open so that the rate of catalyst withdrawn from the reactor 10 is throttled solely by the column in the shaft 45 and is controlled solely by the rate of contact material entry into lift pipe 38. In some operations, however, it may be desirable to control the contact material flow rate by valves 49 and 36. Spent contact material is suspended in the lower portion of shaft 45 and caused to enter the lift pipe 38 in which it is carried upwardly by a stream of flue gas or air into the upper section of regenerator 11. The lift gas may be withdrawn from the top of the regenerator via conduit 18 and the spent catalyst falls down onto the bed 51 within the regenerator. The spent catalyst moves downwardly in the substantially compact bed 51 and is contacted with a suitable combustion supporting gas such as air to effect removal of contaminant deposits by burning. The catalyst temperature may be controlled below a heat damaging level by relatively few heat transfer tubes positioned in the lower portion of the regenerator. The reason that only a relatively small amount of cooling is required to control the catalyst temperature in the regenerator is that the catalyst may be circulated at a high enough rate to effect absorption of most of the heat of regeneration in the catalyst as sensible heat below the heat damaging level. Regenerated catalyst is withdrawn from the lower section of the regenerator through conduit 36 onto the column of contact material in the shaft 24 to complete the cycle. The bed levels in the reactor and regenerator should be controlled within a range of several feet within the upper sections of these vessels. Level indicators are provided in the reactor and regenerator vessels. These may take any of a number of forms, the devices shown at 200 and 200' are motor driven rotary paddle type indicators which register the levels at instruments 201 and 201' by measurement of the current required by the motors to rotate the paddles. The contact material circulation rate to the two vessels should be controlled by adjustment of sleeves 33 at the base of lift pipes 21 and 38 so as to maintain the surface levels in the reactor and regenerator reasonably constant. If desired, instrumentations may be provided to automatically adjust the sleeves 33 in response to readings in level indicators 201 and 201' so as to maintain the bed levels in the reactor and the regenerator in proper balance.

In a typical operation, the pressure in the reactor 10 near its lower end may be of the order of six pounds per square inch. Escape of hydrocarbons through pipe 48 is prevented by the maintenance of a steam or inert gas blanket below the reaction zone in vessel 10, at a pressure slightly higher than that in the reaction zone. This seal gas is induced via conduit 14 and also serves to purge the catalyst free of reactants. The withdrawal conduit 48 is vertical along a substantial portion of its length and should preferably be of a substantial slope along all portions of its length, for example at a slope of greater than 60° with the horizontal. The conduit 48 should be of sufficient length and sufficiently restricted cross section to prevent substantial escape of the seal gas from reactor 10 therethrough. The pressure in the upper and lower sections of the regenerator 11 may be of the order of one pound per square inch gauge. The pressure required to lift the catalyst from the bottom of shaft 45 into the regenerator is dependent upon the regenerator pressure, upon the height of the regenerator above the ground, the rate of material flow through the lift pipe and the catalyst stream density within the lift pipe 38. As an example, this pressure may be of the order of seven pounds just below the flared lower end of the lift pipe. Since the pressure at the upper end of shaft 45 is atmospheric, the length of shaft 45 must be sufficient to provide a vertical column of catalyst therein which will create at its lower end a catalyst head greater than the gaseous pressure existing just below the lower end of the lift pipe. It should be understood that the term "head of catalyst" as employed herein in reference to a compact column or "leg of catalyst," is intended to mean the weight of catalyst per unit or area exerted at the lower end of the catalyst by the catalyst in the column thereabove. This term may be calculated by dividing the total weight of the catalyst in the column by the horizontal cross sectional area of the column at its lower end. In making this calculation only the substantially vertical portion of the column should be counted. When the pressure drop across the leg is high and the leg is very long, the full calculated head effect can only be obtained by tapering the leg so that the gas velocity is substantially constant throughout the leg length. The height of column required to overcome a given gaseous pressure is dependent upon the catalyst density. In the present example, a column of 35 feet in lenght in shaft 45 would be more than adequate for insuring gravity flow of catalyst downwardly in the shaft against the pressure existing below the lower end 39 of lift pipe 38. The pressure required at the lower end of lift pipe 21 is somewhat higher than that required for lift pipe 38 due to the fact that lift pipe 21 discharges into the upper section of reactor 10 which may exist under a pressure of above 7 to 8 pounds per square inch gauge. For example, a pressure of about 18 pounds may be required below the lower end of lift pipe 21. In order to insure proper catalyst flow the vertical length of the shaft 24 above the lower end of lift pipe 21 should be of the order of 80 to 90 feet, when the shaft 24 is tapered so that its diameter is longest at its upper end and the shaft length should be somewhat greater if the shaft is not tapered. Steam may be admitted into the gas space 29 at a rate controlled by the pressure differential controller 31 sufficient to maintain the pressure at 29 at 18½ pounds per square inch, thereby effectively preventing escape of hydrocarbons upwardly through the shaft 24 to the atmosphere.

In order to reduce the amount of steam required to maintain the seal within the shaft 24, the modification shown in Figure 2 may be substituted for that shown in Figure 1. In Figure 2, there is shown the lower end of shaft 24 in which there is provided an expanded portion 26 into which the part of the shaft 24 above depends so as to provide a gas space 29. Also, there is provided below the expanded portion 26 and above the flared end 22 of the lift pipe 21 a horizontal partition 60 across the shaft. Pipes 61 depend from the partition for catalyst flow. The inert seal gas is introduced via conduit 28 into space 29 at a rate sufficient to maintain the pressure in space 29 slightly above that in the space 62 below partition 60. Part of the seal gas entering through pipe 28 passes down through the catalyst column between gas space 29 and partition 60 and down through pipe 61 and into the lower end of the lift pipe. Another and smaller portion of the seal gas passes upwardly through the shaft 24 to the atmosphere.

Instead of discharging the contact material directly from the lift pipes into the reactor and regenerator vessels at a level above the reaction and regeneration zone, the locations of contact material delivery which are in gravity flow communication with the reaction and regeneration zones may be in separation chambers positioned a substantial distance above and outside of the reactor and regenerator vessels. Such an arrangement is shown in Figure 3 in which elements corresponding to those in Figure 1 are indicated by corresponding numerals. In Figure 3, regenerated contact material passes from regenerator 11 through vertical conduit 110 to receptacle 115 wherefrom it is caused to enter lift pipe 116 by an inert gas stream introduced under pressure via pipe 117. Conduit 110 is vented through louvers 112 therein at an intermediate level along its length. Any gas leaving conduit 110 via louvers 112 is caught in manifold box 111 which in turn is vented at 120 to the atmosphere. Any catalyst which may be lost through louvers 112 may be removed via conduit 121 and returned to the system at a suitable location. The lift pipe 116 discharges catalyst and lift gas into cyclone separator 122 located above reactor 10. Lift gas is withdrawn to the atmosphere via separator outlet 123 so that the upper end of lift 116 is in effect vented to the atmosphere. Separated catalyst settles into hopper 124 which is also maintained at about atmospheric pressure and then the catalyst flows through the elongated gravity feed leg 126 into reactor 10 against the pressure therein. Spent contact material passes from the bottom of reactor 10 via conduit 125 to receptacle 130 in which it is induced to enter lift pipe 126 by an inert gas stream supplied via conduit 127. Conduit 125 is vented to the atmosphere at an intermediate level similarly to conduit 110. Catalyst and lift gas discharge from lift 126 into cyclone separator 131 from which separated lift gas is withdrawn to the atmosphere via conduit 132. Separated catalyst passes to hopper 133 and then by gravity feed leg 134 into regenerator 11.

If desired, the two contacting vessels may be arranged one above the other so that only one pneumatic device is required to accomplish the catalyst circulation through the system. Such an arrangement is shown in Figure 4. In Figure 4, there is shown at the highest level a regenerator 70 having an air inlet 71 at an intermediate level and flue gas outlets 72 at its lower end and 73 near its upper end. A partition 74 is provided across the upper section of vessel 70 to provide in its upper end a surge chamber 75. A lift gas outlet 76 connects into the top of the surge chamber 75. A throttle valve 77 is provided on outlet 76. Conduits 107 depend from partition 74 down to the bed 78 in the regeneration chamber. A convertor 80 is positioned at a level substantially below regenerator 70 and is provided near its lower end with a reactant inlet 81 and near its upper end within an outlet 82. A horizontal partition 83 having dependent catalyst flow pipes 84 is positioned across the upper section of vessel 80 to provide a surge and seal chamber 85 within the upper end of vessel 80. A seal gas inlet 87 having a diaphragm valve 88 thereon connects into the seal chamber 85. A purge steam inlet 86 connects into vessel 80 below the level of reactant inlet 81. A conduit 90 extends downwardly from the bottom of vessel 70 into the seal chamber 85. The conduit 90 is vertical along most of its length and acts as a gravity feed leg to permit flow of catalyst from the regenerator operated at a low pressure to the seal chamber operated at a higher pressure. The length of this leg 90 depends on the differential pressure between these chambers. A single lift pipe 92 extends upwardly from a level below the ground through the regenerator chamber and into the separation chamber 75 where it terminates at an intermediate level. A closed feed tank 93 is provided around the lower end of lift pipe 92. This tank is adapted to maintain a bed of catalyst both above and below the lower end of the lift pipe. An adjustable sleeve 94 surrounds the flared lower end of lift pipe 92. A conduit 95 extends downwardly from the bottom of convertor 80 into a depressuring chamber 96 therebelow and terminates at an intermediate level therein. A gas outlet 97 connects into the top of the depressuring chamber and a tapered conduit 98 extends downwardly from the bottom of depressuring chamber into the lift feed tank, which it enters at a level substantially above the lower end of lift pipe 92.

In a typical operation the convertor may be operated at about 10 pounds per square inch gauge pressure and catalyst passes downwardly therefrom through the seal leg 95 onto a bed of catalyst maintained in the depressuring chamber 96. A small amount of seal steam supplied via conduit 86 escapes down through the pipe 95 into the depressuring chamber and is withdrawn via conduit 97 either directly to the atmosphere or to a suitable condenser or separator maintained at atmospheric pressure. Catalyst passes down from the bottom of depressuring chamber 96 through a tapered gravity feed leg 98 which should be vertical along at least most of its length so that the catalyst flows through the feed leg 98 against any gaseous pressure existing within lift feed tank 93. The feed leg discharges the catalyst directly onto the surface of the bed thereof maintained in the lift feed tank 93. It will be noted that pipes 95 and 98 and the compact stream of catalyst flowing therein are of substantially less horizontal cross-sectional area than the contacting vessel at the upper end of pipe 95 and than the lift feed tank 93. Suitable inert lift gas such as flue gas which may be supplied from a source outside of the system enters through conduit 100 into the lift tank 93 and passes upwardly through the lift pipe 92 along with some of the catalyst. The transported catalyst discharges into the separation chamber 75 and settles onto the bed of catalyst therein. Separated lift gas passes from chamber 75 through conduit 76. The pressure in 75 may be controlled by valve 77 equal to or slightly greater than that in the regenerator chamber 78 therebelow. Catalyst flows downwardly through conduit 77 onto the bed in the regeneration chamber where its regeneration is effected, and then the regenerated catalyst passes downwardly through the gravity leg 90 into the seal zone 85 which is maintained under an inert gas pressure slightly higher than that existing in the reaction zone therebelow. In a typical operation, the pressure in the lower section of the regenerator may be of the order of one pound per square inch so that a pressure differential of about 10 pounds exists between the lower section of regenerator and the seal chamber 85. The length of the seal leg 90 should be sufficiently great to overcome this pressure differential. The principle of operation of gravity feed legs of this type which are involved not only at 90 but also at 98 in Figure 4 and in shafts 24 and 45 of Figure 1 is described in detail in United States Patent Number 2,410,309, issued October 29, 1946, and in application Serial Number 488,686, filed in the United States Patent Office May 27, 1943. In the present example, the leg 90 should have a vertical height of about 40 feet if it is tapered and more if not tapered. In the present example, the amount of pressure existing in the feed tank 93 will depend upon the length of lift pipe 92 as well as upon the stream density therein and upon the rate of material flow. As a typical illustration the lift pipe may be about 200 feet long and the catalyst density therein may be of the order of ten pounds per cubic foot in which gas the pressure in the lift feed tank will be of the order of 18 pounds per square inch gauge, allowing for a pressure of one pound gauge within the chamber 75. In order to insure proper gravity flow of catalyst through conduit 98 from depressuring chamber 96 into the lift feed tank, the vertical length of tapered conduit 98 should be of the order of 70–80 feet with the catalyst density in the stream 98 of about 40 pounds per cubic foot.

If desired, the convertor may be operated at a lower pressure than the regenerator in the arrangement shown in Figure 4. For example, the convertor may be maintained at a pressure of about 5 pounds per square inch gauge while the pressure in the regenerator and separation chamber 75 is of the order of 15 pounds per square inch gauge. In such event the length of seal leg 90 may be relatively short, for example about ten feet. On the other hand in the latter operation, the vertical length of the leg 98 should be increased to overcome a pressure in the feed tank of about 32 pounds per square inch gauge. A tapered leg length of about 125–145 feet is satisfactory for this purpose. A nontapered leg should be about 200 feet long for the same purpose. It will be noted that at least most of this leg length will be below the level of the ground so that the elevation of the regenerator and convertor in this arrangement above ground level is not exceedingly great. Inasmuch as in this latter arrangement the length of the seal leg 90 is short there is provided a conversion system requiring only one gas lift device, which system is of unusually low over all height above ground level. It will be understood that in the arrangement of Figure 4 the vessel 80 may be employed as the regenerator and the vessel 70 may be employed as the reactor if desired.

It will be apparent from the above that by virtue of the vent to the atmosphere provided in the contact material passage between the lower end of the gas lift pipe and the contacting vessel from which contact material flows to the lift pipe, the conditions of gas velocity, and catalyst density and velocity in the lift pipe may be varied at will independently of the operation in said contacting vessel. Likewise, the pressure conditions within the contacting vessel may be varied without having any effect on the gas lift operation. While this invention is not considered as limited in its broadest form to the location of the lift feed receptacle below ground level, that improvement is the preferred form of the invention since it permits the application of pneumatic transfer to moving bed systems without substantial increase in overall unit height over that of present systems employing bucket elevators for contact material transfer. Also, in its broadest form the invention is intended to cover not only the use of pressure lifts wherein the contact material lifting is effected by gas introduction under superatmospheric pressure but also suction lifts where contact material is sucked upwardly from a feed tank operating near atmospheric pressure to a separation chamber thereabove which is maintained under a substantial vacuum.

In general, the proper gas velocity to be maintained within the lift pipe varies depending on the particular gas and contact material involved, the pressure and temperature in the lift pipe, and the length of the lift. As an example, in a lift employing air at about 900° F. as the lift gas for lifting spherical bead form synthetic silica-alumina catalyst of about 4 to 20 mesh Tyler size and 45 pounds per cubic foot packed density, the linear gas velocity in the lift pipe should be within the range about 40 to 100 feet per second and preferably 45 to 60 feet per second while the catalyst linear velocity is within the range about 15 to 50 feet per second and preferably within the range 15 to 30 feet per second, where the stream density in the lift pipe is about 8 pounds per cubic foot and the lift pressure was atmospheric and about 11 to 12 pounds per square inch gauge at its upper and lower ends respectively. Under these preferred conditions, a lift pipe having an internal diameter of about 14 inches and a height of 180 feet can satisfactorily handle about 95 tons per hour of contact material.

It should be understood that the particular details of apparatus design and operation conditions and the particular examples of the application of this invention given hereinabove are intended as illustrative and are not to be construed as limiting the scope of this invention except as it is limited by the following claims.

We claim:

1. In a process wherein a granular contact material is passed cyclically through two contacting zones, one being a reaction zone wherein it flows downwardly as a substantially compact column while contacting a fluid hydrocarbon charge to effect conversion of said charge to gasiform products and the other zone being a reconditioning zone wherein the contact material flows downwardly as a substantially compact column while being contacted with a suitable gas to effect its reconditioning for reuse in said conversion zone, the improved method for effecting transfer of contact material from one of said contacting zones to the other which comprises: withdrawing contact material downwardly from the lower section of one of said contacting zones located a short distance above ground level as a substantially compact gravitating stream of sufficient length and sufficiently restricted cross section to prevent substantial escape of gas from said contacting zone, delivering said stream onto the upper end of a substantially compact seal column of said contact material which extends vertically downward below ground level throughout at least most of its length to a location substantially below ground level where its suspension in a suitable lift gas under superatmospheric pressure is effected, the vertical length of said column being sufficient to create a head of contact material greater than the superatmospheric pressure maintained at said location of suspension, maintaining the pressure at the upper end of said column substantially atmospheric by withdrawing therefrom any gas reaching the upper end of said column from said contacting zone and from said location of suspension, causing the suspended contact material to be lifted by said lift gas upwardly as a confined stream to a location above the other contacting zone and passing the lifted contact material downwardly from said last named location onto the column in said other contacting zone.

2. A process for converting fluid hydrocarbons to lower boiling products in the presence of a granular contact mass material comprising: passing reconditioned contact material at a suitable temperature for effecting said hydrocarbon conversion downwardly from the bottom of a confined reconditioning zone maintained shortly above ground level as a confined compact seal stream of restricted cross-section onto the surface of a compact vertical column of said contact material which extends downwardly from its surface near ground level to a lift feed region maintained under superatmospheric gaseous pressure at a level substantially below ground level, introducing a gasiform hydrocarbon charge into said column near its lower end to effect suspension of the reconditioned contact material therein and pneumatically conveying the suspended contact material upwardly as a confined stream through said column and up into the upper section of a confined conversion zone, causing the contact material to fall onto a substantially compact bed of said contact material in said conversion zone and passing the said gasiform hydrocarbon charge down through said bed to effect its conversion to a lower boiling product, withdrawing said product from the lower section of said bed, passing spent contaminant bearing contact material from the bottom of said bed to said reconditioning zone, passing the spent contact material downwardly through said reconditioning zone as a substantially compact bed while contacting it with a suitable gas to effect its reconditioning for reuse in said conversion zone, maintaining the pressure of introduction of said gasiform charge into the lower section of said column sufficiently high to effect the pneumatic conveying of the contact material as aforesaid but below a pressure which would correspond to the head of contact material in said column thereabove, whereby the contact material gravitates downwardly through said column against a small amount of gas flowing upwardly therethrough and venting said gas from the surface of said column to maintain substantially atmospheric pressure at said surface, introducing an inert seal gas into the lower section of said column shortly above the level of hydrocarbon charge introduction, and controlling the rate of introduction of said seal gas to maintain the seal gas pressure in said column at the level of seal gas introduction above that of the hydrocarbon charge therebelow whereby loss of hydrocarbon charge from the surface of said column is prevented.

3. In a process wherein a granular contact material is passed cyclically through two contacting zones, one being a reaction zone wherein it flows downwardly as a substantially compact column while contacting a fluid hydrocarbon charge to effect conversion of said charge to gasiform products and the other zone being a reconditioning zone wherein the contact material flows downwardly as a substantially compact column while being contacted with a suitable gas to effect its reconditioning for reuse in said conversion zone, the improved method for effecting circulation of said contact material through said zones which comprises: passing contact material from the bottom one of said contacting zones downwardly as a substantially compact, confined seal stream of restricted cross-section onto the surface of a bed of said contact material in an enlarged zone, withdrawing gas from the top of said zone spaced above the surface of said bed to maintain the pressure in said enlarged zone substantially atmospheric, passing contact material by gravity flow downwardly from said bed as a substantially compact stream extending downwardly as a vertical stream throughout most of its length onto a bed of said contact material in an enclosed gas-solid mixing zone maintained under pressure, said stream being of substantially less horizontal cross-sectional area than said beds in the enlarged zone and in the mixing zone and the vertical height of said stream being sufficient to insure gravity flow of the contact material down to said mixing zone against the gaseous pressure therein and against gas flowing upwardly from said mixing zone through the compact stream to said enlarged zone, introducing a suitable lift gas into said mixing zone at a rate and pressure controlled to effect pneumatic conveying of the contact material upwardly from said mixing zone as a confined stream into a separation zone located above the other of said contacting zones which in turn is located a substantial distance above the first named contacting zone, effecting separation of the contact material from the lift gas and flowing the contact material downwardly into said second named contacting zone, and passing contact material from the lower end of said second named contacting zone downwardly as a confined stream to the first named contacting zone, said last named stream being compact and vertical along at least most of its length and being of sufficient length to insure gravity flow of contact material into said first named contacting zone against the pressure therein.

4. In a system wherein a granular contact material is passed cyclically through two contacting chambers, one being a conversion chamber wherein it flows downwardly as a substantially compact column while contacting a fluid hydrocarbon charge to gasiform products and the other zone being a reconditioning chamber wherein the contact material flows downwardly as a substantially compact column while being contacted with a suitable gas to effect its reconditioning for reuse in said conversion chamber the improved apparatus for effecting transfer of contact material from one of said contacting chambers to the other which comprises in combination: a closed lift feed receptacle adapted to contain a bed of contact material separate and apart from said contacting chambers, a lift pipe open on its ends, extending upwardly from a point above but near the bottom of said receptacle to a location which is in flow communication with the upper section of one of said contacting chambers, a depressuring chamber adapted to contain a bed of contact material and vented on top positioned at a level between the bottom of the other of said contacting chambers and said receptacle, a conduit extending upwardly from said receptacle to the bottom of said depressuring chamber, said conduit being of substantial length and being vertical along at least most of its length and being of substantially less cross-section than said depressuring chamber and said receptacle, a conduit extending upwardly from an intermediate level within said depressuring chamber to the bottom of said other contacting chamber, said last named conduit being vertical along at least part of its length and being of substantially less cross-section than said contacting chamber and said depressuring chamber, a gas inlet conduit connected into the lower section of said receptacle and terminating directly below the lower end of said lift pipe.

5. In a system wherein a granular contact material is passed cyclically through two contacting vessels, one being a reaction vessel and having spaced apart reactant inlet and outlet means a contact material inlet at its upper end and a contact material outlet at its lower end, and the other being a regeneration vessel having spaced apart gas inlet and outlet means and a contact material inlet at its upper end and a contact material outlet at its lower end, both of said vessels being positioned a spaced distance above ground level, the improved means for transferring contact material from one of said vessels to the other which comprises in combination: a lift pipe extending upwardly from its open lower end at a location substantially below ground level to its open upper end at a location which is at least as high as the upper section of said one of said contacting vessels and in flow communication therewith, said lift pipe having an outwardly flared, downwardly facing lower end, a closed receptacle surrounding a lower portion of said lift pipe including its lower end, said receptacle having its bottom spaced below the lower end of said lift pipe, a gas inlet conduit connected into the bottom of said receptacle and terminating a short distance below and directly beneath the flared lower end of said lift pipe, movable sleeve closely surrounding the flared lower end of said lift pipe, a device adapted to raise and lower said sleeve so as to permit change in the effective distance between said gas inlet conduit and the entry to said lift pipe, said device being controllable from above ground level, members defining an elongated confined passage of substantial length for solid flow from the bottom of the other of said contacting vessels which is only a short distance above ground level to said receptacle, said passage being vertical along at least a substantial portion of its length and having a major portion of its vertical length underground and being of substantially less cross-section than said receptacle and said contacting vessel.

6. In a system wherein a granular contact material is passed cyclically through two contacting chambers, one being a conversion chamber wherein it flows downwardly as a substantially compact column while contacting a fluid hydrocarbon charge to effect conversion of said charge to gasiform products and the other zone being a reconditioning chamber wherein the contact material flows downwardly as a substantially compact column while being contacted with a suitable gas to effect its reconditioning for reuse in said conversion chamber, the improved apparatus for effecting transfer of contact material from one of said contacting chambers to the other which comprises in combination: an upright lift pipe having its open lower end at a level substantially below one of said contacting chambers and its open upper end in communication with the upper section of the other of said contacting chambers, a closed receptacle, separate and apart from said contacting chambers, adapted to contain a bed of contact material surrounding the open lower end of said lift pipe, said lift pipe having its lower end at a level intermediate the top and bottom of said receptacle, members defining a confined downwardly extending passageway for contact material flow from the bottom of said first contacting chamber to a location in said receptacle spaced above the lower end of said lift pipe, said passageway being vented to the atmosphere at an intermediate level along its length which is spaced a substantial distance above said receptacle, said passageway being substantially vertical along at least some of its length above the vent level and along most of its length below the vent level and being of substantially less cross-sectional area than said first contacting chamber and than said receptacle, and means to introduce gas into the lower end of said lift pipe.

7. A cyclic apparatus for hydrocarbon conversion comprising a closed upright convertor vessel having spaced apart reactant inlet and outlet means, said convertor vessel being positioned a substantial distance above ground level, a closed upright regenerator vessel having spaced apart gas inlet and outlet means, said regenerator having its bottom closure only a short distance above ground level, means to transfer contact material from the lower section of the convertor into the upper section of the regenerator, a lift pipe extending upwardly from its open lower end at a location substantially further below ground level than the bottom closure of the regenerator is above ground level to its open upper end at a location which is at least as high as the upper section of the convertor and in flow communication therewith, a closed receptacle below ground level adapted to contain a bed of contact material surrounding the lower end of said lift pipe, members defining a confined downwardly extending passageway for contact material flow from the bottom of the regenerator to said closed receptacle, said passageway being of substantially less cross sectional area than said regenerator and than said closed receptacle and being vented to the atmosphere at an intermediate level along its length which is spaced a substantial distance above said receptacle, the passageway being vertical along a substantial portion of its length above the vent and along most of its length below said vent and having at least most of its length below the vent below ground level and a gas inlet conduit connecting into said receptacle.

8. In a process wherein a granular contact material is passed cyclically through two contacting zones, one being a reaction zone wherein it flows downwardly as a substantially compact column while contacting a fluid hydrocarbon charge to effect conversion of said charge to gasiform products and the other zone being a reconditioning zone wherein the contact material flows downwardly as a substantially compact column while being contacted with a suitable gas to effect its reconditioning for reuse in said conversion zone, the improved method for effecting transfer of contact material from one of said contacting zones to the other which comprises: withdrawing contact material downwardly from the lower section of one of said contacting zones as a substantially compact gravitating stream of sufficient length and sufficiently restricted cross-section to prevent substantial escape of gas from said contacting zone, delivering said stream onto the upper end of a substantially compact feed leg of said contact material which is vented to a region of substantially atmospheric pressure at its upper end, flowing the contact material downwardly through said leg in a vertical direction along at least the major portion of the length thereof onto a bed of said contact material in a confined lift feed zone, which is maintained under a gaseous pressure substantially above atmospheric pressure, the vertical length of said leg being sufficient to provide a head of contact material at its lower end greater than the pressure in said feed zone and the horizontal cross-sectional area of said leg being substantially less than that of said bed, whereby the contact material gravitates through said leg against a small amount of gas flowing upwardly from said lift feed zone, withdrawing said last named gas to said vented region so as to prevent its entry into said contacting zone, effecting suspension of contact material in said feed zone in an upwardly flowing stream of lift gas and lifting said contact material in said stream to a location from which it may flow downwardly through the other of said contacting zones, and maintaining the gaseous pressure in said lift feed zone sufficiently above that at said last named location to effect the lifting of the contact material as aforesaid.

9. In a process wherein a granular contact material is passed cyclically through two contacting zones, one being a reaction zone wherein it flows downwardly as a substantially compact column while contacting a fluid hydrocarbon charge to effect conversion of said charge to gasiform products and the other zone being a reconditioning zone wherein the contact material flows downwardly as a substantially compact column while being contacted with a suitable gas to effect its reconditioning for reuse in said conversion zone, the improved method for effecting transfer of contact material from one of said contacting zones to the other which comprises: flowing the contact material downwardly as at least one substantially compact, continuous, elongated stream of restricted cross-section from said contacting zone to an enclosed lift feed zone maintained under superatmospheric pressure, said compact stream being vertical throughout at least a major portion of its length, introducing a stream of lift gas under superatmospheric pressure into said lift feed zone to effect suspension of contact material delivered from said compact stream, pneumatically conveying the suspended contact material as a confined stream upwardly to a location above the other contacting zone, flowing the contact material from said location downwardly through said other contacting zone, releasing the pressure on said compact elongated stream of contact material to substantially atmospheric pressure at an intermediate point along its length, located so as to leave a portion of said stream above the point of pressure release of sufficient length and sufficiently restricted cross-section to effectively seal the first named contacting zone against substantial loss of gas through said compact stream and so as to leave a portion of said compact stream below said point of pressure release of sufficient vertical length and restricted cross-section to force the contact material to flow by gravity into said lift entry zone against the pressure therein and against a small amount of gas rising through said compact stream from the lift entry zone to the point of pressure release and withdrawing said last named gas from said compact stream at said point of pressure release.

10. In a process wherein a granular contact material is passed cyclically through two contacting zones, one being a reaction zone wherein it flows downwardly as a substantially compact bed while contacting a fluid hydrocarbon charge to effect conversion of said charge to gasiform products and the other zone being a reconditioning zone wherein the contact material flows downwardly as a substantially compact bed while being contacted with a suitable gas to effect its reconditioning for reuse in said conversion zone, the improved method for effecting transfer of contact material from one of said contacting zones to the other which comprises: maintaining one of said contacting zones at a level shortly above ground level, passing the contact material downwardly as a substantially compact, continuous, confined stream of restricted cross-section from the lower end of said contacting zone to a confined lift entry zone maintained at a superatmospheric pressure and positioned a substantial distance below ground level, introducing a stream of lift gas under pressure into said lift entry zone to effect suspension of contact material delivered by said compact stream, maintaining the pressure of introduction of said lift gas sufficiently high to effect lifting of the suspended contact material to a location above said column in said conversion zone and passing the lifted contact material down onto said column to supply the same, and releasing the pressure on said compact elongated stream of contact material to substantially atmospheric pressure at an intermediate point along its length, located so as to leave a portion of said stream above the point of pressure release of sufficient length and sufficiently restricted cross-section to effectively seal the reconditioning zone against substantial loss of gas through said compact stream and so as to leave a portion of said compact stream extending downwardly below the point of pressure release mostly below the ground level of sufficient vertical length and restricted cross-section to force the contact material to flow by gravity into said lift entry zone against the pressure therein without excessive loss of gas upward through said compact stream.

References Cited in the file of this patent

UNITED STATES PATENTS

| Number | Name | Date |
|---|---|---|
| 1,498,630 | Jensen | June 24, 1924 |
| 1,892,920 | Weiss | Jan. 3, 1933 |
| 1,994,899 | Schaub | Mar. 19, 1935 |
| 2,412,152 | Huff | Dec. 3, 1946 |
| 2,440,475 | Jacomini | Apr. 27, 1948 |
| 2,448,272 | Payne et al. | Aug. 31, 1948 |
| 2,463,623 | Huff | Mar. 8, 1949 |
| 2,464,257 | Pelzer et al. | Mar. 15, 1949 |
| 2,487,961 | Angell | Nov. 15, 1949 |
| 2,493,911 | Brandt | Jan. 10, 1950 |
| 2,509,983 | Morrow | May 30, 1950 |
| 2,561,409 | Ardern | July 24, 1951 |
| 2,561,771 | Ardern | July 24, 1951 |